United States Patent
Bhushan

(10) Patent No.: US 8,694,017 B2
(45) Date of Patent: Apr. 8, 2014

(54) METHOD AND APPARATUS FOR INTERFERENCE MANAGEMENT IN A WIRELESS COMMUNICATION SYSTEM

(75) Inventor: Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 726 days.

(21) Appl. No.: 12/410,774

(22) Filed: Mar. 25, 2009

(65) Prior Publication Data

US 2010/0248632 A1 Sep. 30, 2010

(51) Int. Cl.
*H04W 72/00* (2009.01)
*H04B 7/00* (2006.01)
*H04W 4/00* (2009.01)
*H04B 1/00* (2006.01)
*H04J 11/00* (2006.01)

(52) U.S. Cl.
USPC .......... 455/452.2; 455/509; 455/69; 455/434; 370/329; 370/209

(58) Field of Classification Search
USPC ........ 455/63.1, 63.2; 370/204, 205, 328–337, 370/342–350; 708/250
See application file for complete search history.

(56) References Cited

U.S. PATENT DOCUMENTS

| | | | |
|---|---|---|---|
| 5,794,139 A * | 8/1998 | Mizikovsky et al. | 455/403 |
| 5,821,854 A | 10/1998 | Dorinski et al. | |
| 2004/0022176 A1* | 2/2004 | Hashimoto et al. | 370/204 |
| 2005/0107036 A1* | 5/2005 | Song et al. | 455/23 |
| 2005/0127164 A1 | 6/2005 | Wankmueller | |
| 2006/0136997 A1 | 6/2006 | Telek et al. | |
| 2009/0046632 A1* | 2/2009 | Nanda et al. | 370/328 |
| 2009/0046665 A1 | 2/2009 | Robson et al. | |
| 2009/0124235 A1* | 5/2009 | Bosch et al. | 455/411 |
| 2009/0271462 A1* | 10/2009 | Schneider | 708/250 |

FOREIGN PATENT DOCUMENTS

WO WO 2009017984 A1 2/2009

OTHER PUBLICATIONS

International Search Report—PCT/US2009/042878—ISA/EPO—Dec. 30, 2009.
Written Opinion—PCT/US2009/042878—ISA/EPO—Dec. 30, 2009.
Taiwan Search Report—TW098114903—TIPO—Nov. 26, 2012.

* cited by examiner

*Primary Examiner* — Dwayne Bost
*Assistant Examiner* — Nalini Mummalaneni
(74) *Attorney, Agent, or Firm* — Ashish L. Patel

(57) ABSTRACT

Systems and methodologies are described that facilitate secure interference management in a wireless communication system. Techniques are described herein to enable a terminal jammed by a nearby base station to submit a request to the nearby base station to set aside interlaces and/or other communication resources while preventing attacks wherein such requests are submitted arbitrarily. As described herein, a base station receiving a request for reservation of resources can require proof that an entity requesting the reservation is actually jammed by the base station by constructing and transmitting a signal using random number and/or other information such that the information can be correctly decoded only at or above a minimum signal quality. A tiered technique is additionally described herein, wherein multiple signals are constructed and transmitted such that the respective signals are correctly decodable at varying signal quality thresholds.

39 Claims, 11 Drawing Sheets

METHOD AND APPARATUS FOR INTERFERENCE MANAGEMENT IN A WIRELESS COMMUNICATION SYSTEM

BACKGROUND

I. Field

The present disclosure relates generally to wireless communications, and more specifically to techniques for interference control in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

As the demand for high-rate and multimedia data services rapidly grows, there has been an effort toward implementation of efficient and robust communication systems with enhanced performance. For example, in recent years, users have started to replace fixed line communications with mobile communications and have increasingly demanded great voice quality, reliable service, and low prices.

In addition to mobile telephone networks currently in place, a new class of small base stations has emerged, which can be installed in the home of a user and provide indoor wireless coverage to mobile units using existing broadband Internet connections. Such personal miniature base stations are generally known as access point base stations, or, alternatively, Home Node B (HNB) or Femto cells. Typically, such miniature base stations are connected to the Internet and the network of a mobile operator via a Digital Subscriber Line (DSL) router, cable modem, or the like.

Wireless communication systems can be configured to include a series of wireless access points, which can provide coverage for respective locations within the system. Such a network structure is generally referred to as a cellular network structure, and access points and/or the locations they respectively serve in the network are generally referred to as cells.

In order for a terminal to connect to and/or communicate with a base station in a wireless communication system, the connecting terminal and base station can communicate one or more signals to each other on the forward and reverse links. However, if a terminal attempts to connect to a distant base station while in the presence of one or more closer base stations, signals from the closer base stations can jam the terminal and render the terminal unable to receive signals from the base station on the forward link. This can occur when, for example, a terminal attempts to connect to a macro cell in the presence of restricted femto cells to which the terminal does not have access.

In order to obtain service from a desired base station in such a scenario, a terminal can request nearby interfering base stations to set aside certain interlaces for the use of the distant base station serving the terminal. However, a malicious user can abuse this functionality by submitting requests to base stations to set aside interlaces arbitrarily, which could in some circumstances significantly impair the operational ability of the base stations to which the requests are submitted. Accordingly, it would be desirable to implement techniques to mitigate the effects of this and other such attacks on a wireless communication system.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method is described herein that can comprise transmitting at least one authentication signal to the access terminal using a transmitter; receiving a response to the at least one authentication signal from the access terminal that indicates that the access terminal successfully recovered one or more authentication signals from the transmitter; and determining whether the access terminal has received signals from the transmitter at or above a threshold signal quality based on a number of correct responses to respective authentication signals over a predetermined period of time.

Another aspect described herein relates to a wireless communications apparatus that can comprise a memory that stores data relating to one or more proximity verification signals. The wireless communications apparatus can further comprise a processor configured to transmit the one or more proximity verification signals to a terminal, to receive respective responses from the terminal that indicate successful or unsuccessful decoding of the one or more proximity verification signals, and to determine whether the one or more proximity verification signals were received by the terminal at or above a threshold signal quality based on the respective responses.

A third aspect described herein relates to an apparatus that can comprise means for modulating and coding a signal such that a signal quality at or above a predetermined threshold is required for correct decoding of the signal with high probability; means for providing the modulated and coded signal to a terminal using a transmitter; and means for determining strength of a channel from the terminal to the transmitter based on an extent to which the terminal successfully decodes the modulated and coded signal.

A fourth aspect relates to a computer program product, which can comprise a computer-readable medium that comprises code for causing a computer to identify authorization information; code for causing a computer to modulate and code the identified authorization information using modulation and coding parameters selected such that the authorization information can be successfully decoded only if an observed signal quality is at least a threshold value; code for receiving a request to set aside resources from a requesting device; code for communicating the modulated and coded authorization information to the requesting device; and code for causing a computer to set aside requested resources upon identifying that the requesting device has correctly decoded the authorization information.

A fifth aspect described herein relates to an integrated circuit that executes computer-executable instructions. The instructions can comprise modulating and coding at least one signal such that a received signal quality at or above a predetermined threshold is required for correct decoding of the at least one signal; identifying a request to vacate communication resources; and vacating communication resources in response to the request only upon determining that an entity that provided the request to vacate communication resources has correctly decoded the at least one signal.

Another aspect described herein relates to a method, which can comprise submitting a request to a first base station to set aside communication resources in order to enable communication with a second base station; receiving at least one proximity authentication signal from the first base station; decoding the at least one proximity authentication signal; and reporting at least a portion of the at least one decoded proximity authentication signal to the first base station.

Yet another aspect described herein relates to a wireless communications apparatus, which can comprise a memory that stores data relating to a desired base station and an interfering base station. The wireless communications apparatus can further comprise a processor configured to submit a request to the interfering base station to reserve resources in order to enable communication between the wireless communications apparatus and the desired base station, to receive an encoded signal from the interfering base station, to decode the encoded signal, and to communicate at least a portion of the decoded signal back to the interfering base station.

Still another aspect relates to an apparatus that can comprise means for submitting a request to a base station to set aside transmission resources; means for receiving an encoded proximity verification signal from the base station; and means for reporting successful decoding of the proximity verification signal to the base station.

An additional aspect described herein relates to a computer program product, which can comprise a computer-readable medium that comprises code for causing a computer to identify a jamming base station; code for causing a computer to request reservation of communication resources by the jamming base station; code for causing a computer to receive a proximity authentication challenge from the jamming base station; and code for causing a computer to submit a response to the proximity authentication challenge to the jamming base station.

A further aspect relates to an integrated circuit that executes computer-executable instructions. The instructions can comprise submitting a request to a network cell to set aside transmission resources; receiving at least one encoded authorization signal from the network cell; decoding at least a portion of the at least one encoded authorization signal; and communicating one or more decoded portions of the at least one encoded authorization signal to the network cell.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
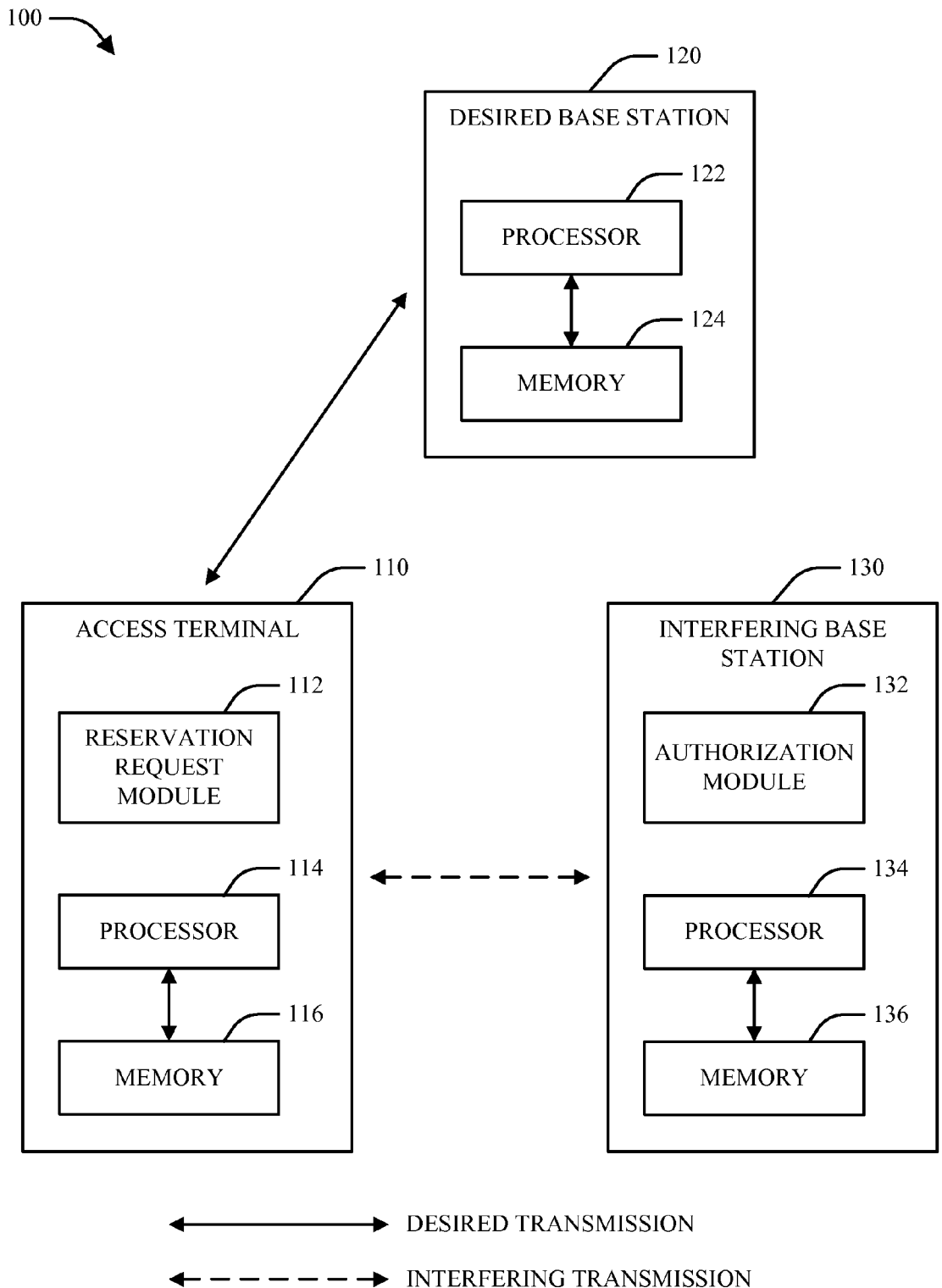
FIG. 1 is a block diagram of a system for interference management in a wireless communication system in accordance with various aspects.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or omit some of the devices, components, modules, etc., discussed in connection with the figures. A combination of these approaches can also be used.

Referring now to the drawings, FIG. 1 illustrates a system 100 for interference management in a wireless communication system in accordance with various aspects described herein. As FIG. 1 illustrates, system 100 can include an access terminal (AT) 110, which can communicate with one or more base stations 120 and/or 130. While only one AT 110 and two base stations 120 and 130 are shown in FIG. 1, it should be appreciated that system 100 can include any number of ATs and/or base stations.

In accordance with one aspect, one or more forward link (FL, also referred to herein as downlink (DL)) transmissions can be conducted from a base station 120 and/or 130 to AT 110, and one or more reverse link (RL, also referred to herein as uplink (UL)) transmissions can be conducted from AT 110 to base station(s) 120 and/or 130. As FIG. 1 further illustrates, an AT 110 can communicate with one or more serving or desired base stations 120 such that one or more neighboring base stations 130 do not engage in regular communication with AT 110.

In order to establish a connection with a desired base station 120 for serving AT 110, AT 110 and the desired base station 120 can exchange connection setup signaling (e.g., access signaling, attachment signaling, etc.) on the forward and reverse links. In one example, base station 120 can provide AT 110 with parameters required for communication between base station 120 and AT 110 within connection setup signaling. These parameters can include, for example, resource profiles, transmission scheduling parameters, power requirements, modulation and coding scheme (MCS) information, or the like. Upon exchanging such setup information, AT 110 and its desired base station 120 can subsequently communicate using one or more of the connection parameters established during the connection setup procedure.

In accordance with another aspect, system 100 can additionally include one or more other base stations 130, which can cause interference to AT 110 and/or a desired base station 120 for AT 110. In one example, signals from interfering base station(s) 130 that are closer to AT 110 than the desired base station 120 of AT 110 can jam AT 110 on the forward link, which can substantially render AT 110 unable to receive signals from its desired base station 120. Such a situation can occur when, for example, a desired base station 120 is a macro cell serving an area in which AT 110 resides and interfering base station(s) 130 is a restricted femto cell to which AT 110 does not have access that serves a coverage area embedded by the macro cell.

Thus, in a scenario in which AT 110 wishes to connect to and/or communicate with a desired base station 120 but is jammed on the uplink by a closer base station 130, AT 110 can request one or more interfering base stations 130 to reserve, or set aside, certain communication resources so that the reserved resources can be utilized for communication between AT 110 and its desired base station 120. In one example, AT 110 can submit such a request using a reservation request module 112 and/or any other suitable component(s) located at and/or otherwise associated with AT 110.

Figure 2:
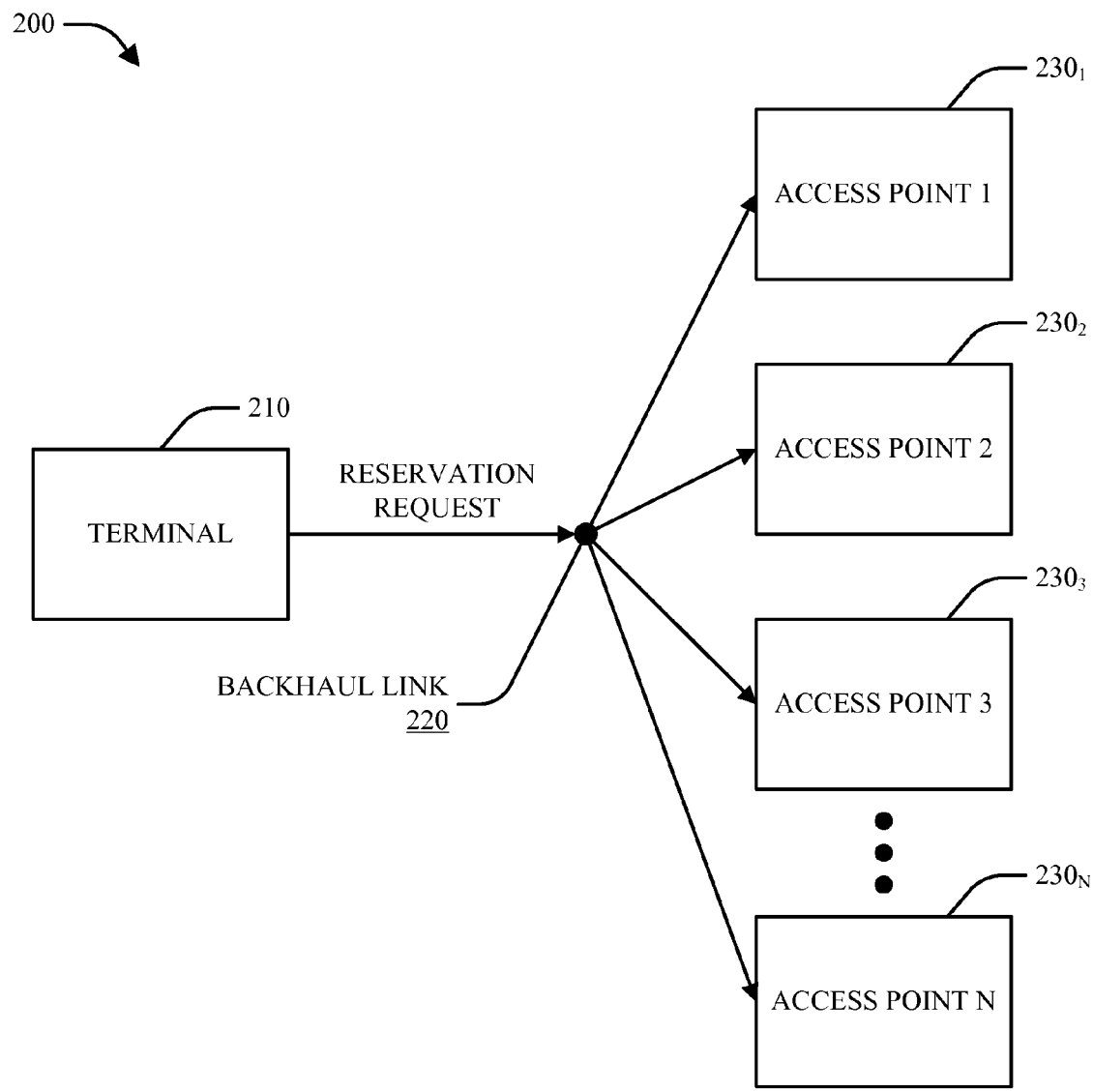
FIG. 2 illustrates an example attack conducted by a terminal against a set of access points in a wireless communication system.

In another example, a femto cell and/or other base station types can be configured to always or nearly always accept a request for reservation of resources from AT 110. However, if a base station 130 is so configured, it can be appreciated that a malicious AT 110 could abuse this functionality by submitting requests to base stations 130 to set aside resources arbitrarily. Such malicious ATs 110 could, for example, request reservation of resources from one or more base stations 130 in numbers and/or positions sufficient to silence and/or otherwise significantly impair the operational ability of base stations 130 to which the requests are submitted. Moreover, as illustrated by system 200 in FIG. 2, a terminal 210 can further exploit this weakness of conventional wireless communication systems to attack multiple base stations or access points 230 in a system. For example, if a terminal 210 is able to submit a malicious reservation request through a network using backhaul signaling (e.g., via a backhaul link 220), the terminal 210 could potentially silence or otherwise significantly impair a large number of access points 230, some of which can in fact be located a large distance away from the requesting terminal 210.

Accordingly, returning to FIG. 1, a base station 130 in system 100 can substantially reduce or eliminate the effects of a potential attack from AT 110 as described above by requiring AT 110 to authenticate its proximity to base station 130. In one example, base station 130 can accomplish this by employing an authorization module 132 and/or another suitable component(s) located at and/or otherwise associated with base station 130. For example, at or prior to the time at which a resource reservation request is received from an AT 110, an authorization module 132 and/or other functionality of base station 130 can require proof from AT 110 that AT 110 is receiving a signal from base station 130 that is sufficiently strong as to jam AT 110 on the uplink. By doing so, base station(s) 130 in system 100 can be substantially assured that AT 110 is only able to submit requests for resource reservation to a relatively small number of base stations 130 that are located within the radio frequency (RF) neighborhood of AT 110 (e.g., within a threshold range of AT 110).

Authorization module 132 at base station 130 can accomplish the above ends by, for example, generating a time-varying random number and encoding and/or modulating the random number at one or more time intervals such that the number can only be decoded if received at or above a threshold signal quality. In connection with a request for interlace reservation from AT 110, base station 130 can subsequently require AT 110 to provide proof of proximity to base station 130 in the form of one or more of the random numbers encoded and broadcast by base station 130. Specific, non-limiting examples of techniques for generating, coding, and broadcasting such random numbers are described in further detail infra.

In accordance with one aspect, AT 110 can include a processor 114 and/or a memory 116, which can be utilized to implement some or all of the functionality of reservation request module 112 and/or any other functionality of AT 110 as described herein. Similarly, base station 120 can include a processor 122 and/or memory 124 that can implement some or all of the functionality described herein, and base station 130 can include a processor 134 and/or memory 136 that can be utilized to implement some or all of the functionality of the authorization module 132 and/or any other functionality of base station 130 as described herein.

Figure 3:
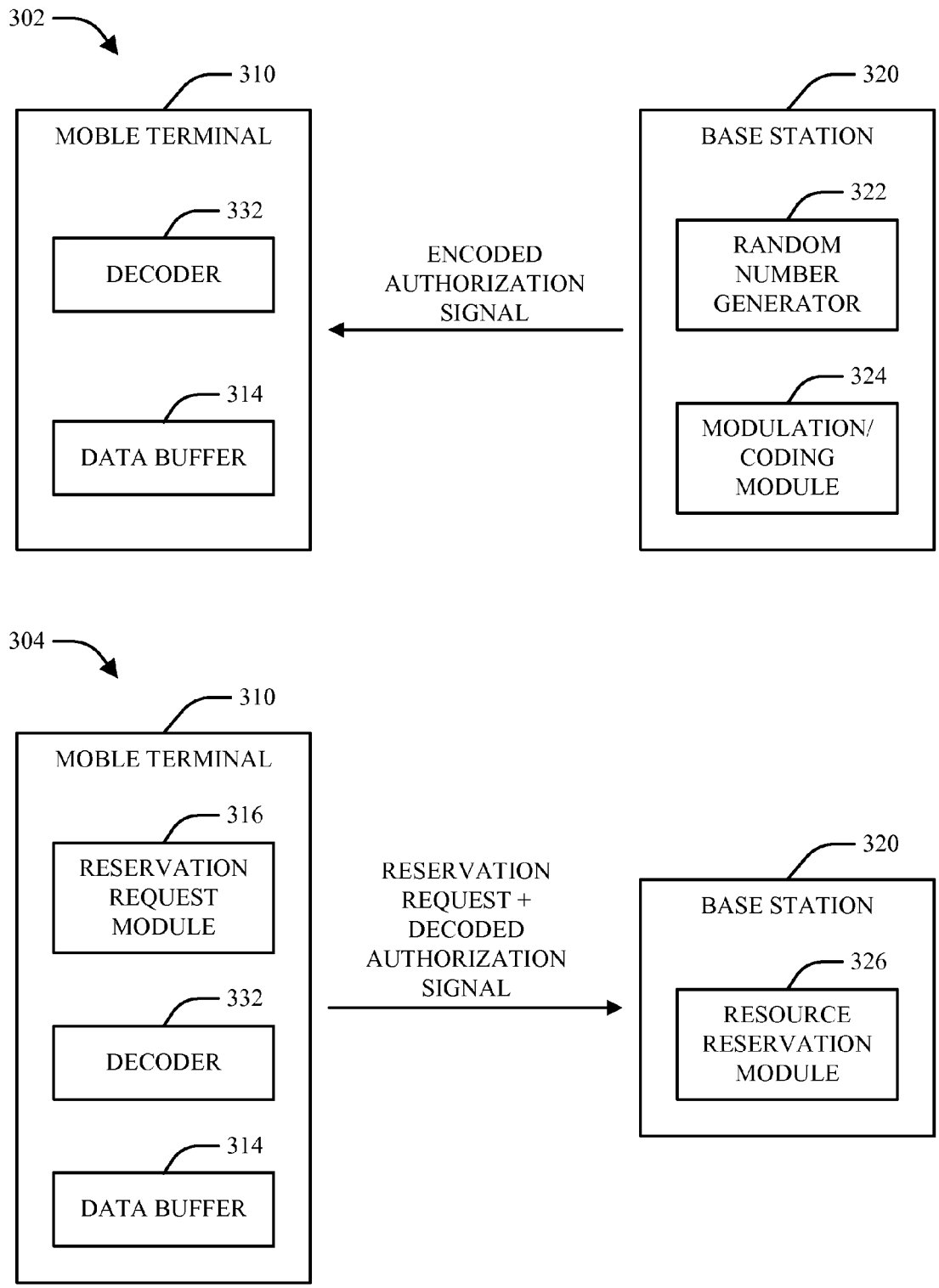
FIGS. 3-4 are block diagrams of respective systems for proximity authentication in a wireless communication system.

Turning to FIG. 3, a series of block diagrams 302-304 are provided that illustrate a system for proximity authentication in a wireless communication system in accordance with various aspects described herein. As FIG. 3 illustrates, a system as illustrated by diagrams 302-304 can include one or more mobile terminals 310 and one or more base stations 320. In one example, a mobile terminal 310 and a base station 320 can communicate with each other; alternatively, mobile terminal 310 and base station 320 may be configured to not directly communicate with each other (e.g. due to base station 320 being a restricted femto cell to which mobile terminal 310 does not have access).

In a case where mobile terminal 310 and base station 320 do not directly communicate with each other, it can be appreciated that base station 320 can cause disruptions and/or interference to a mobile terminal 310 that communicates in a wireless communication system through another, more distant base station (not shown) as generally described above with respect to system 100 in FIG. 1. Thus, as described in relation to system 100, mobile terminal 310 can submit a request (e.g., using a reservation request module 316) to base station 320 to set aside given communication resources in order to enable mobile terminal 310 to connect to and/or otherwise communicate with its serving base station. Communication resources that can be set aside can include, for example, interlaces, subframes, or time slots (e.g., in a TDMA, CDMA, and/or Wideband CDMA (WCDMA) system); subbands (e.g., in an OFDMA system); resource blocks; carriers (e.g., in a multi-carrier system); beams (e.g., in a MIMO and/or Space Division Multiple Access (SDMA) system); or the like.

However, as further noted above, it would be desirable to enable base station 320 to implement measures to protect against attacks by a malicious mobile terminal 310 that submits such requests arbitrarily in an attempt to disrupt services provided by base station 320. Thus, in one example, base station 320 can operate as illustrated in FIG. 3 to require verification or authentication from mobile terminal 310 that mobile terminal 310 observes a sufficiently strong signal from base station 320 prior to reserving resources for mobile terminal 310.

In accordance with one aspect, a procedure used by base station 320 to verify the proximity of mobile terminal 310 within an RF neighborhood can begin as illustrated in diagram 302. As diagram 302 illustrates, base station 320 can utilize a random number generator 322, a modulation/coding module 324, and/or any other suitable component(s) to generate one or more encoded authorization signals to be communicated to mobile terminal 310. As an example, base station 320 can employ random number generator 322 to generate a time-varying random number based on one or more techniques as generally known in the art for random number generation. Upon generating a random number, modulation/coding module 324 can be utilized to construct an authorization signal containing the generated random number such that the number can only be decoded and/or demodulated if an entity receiving the signal has a signal-to-interference-plus-noise ratio (SINR) for base station 320 that is at or above a predetermined value.

In one example, modulation/coding module 324 can accomplish the above ends by selecting a modulation scheme (e.g., Binary Phase Shift Keying (BPSK), Quadrature Phase Shift Keying (QPSK), n-th order Quadrature Amplitude Modulation (n-QAM), etc.) and/or a code rate for the authorization signal based on a predetermined threshold SINR. The threshold SINR can be chosen by base station 320, for example, to correspond to a signal strength which, if observed by a mobile terminal, would be likely to jam the mobile terminal on the uplink and/or render the mobile terminal substantially unable to communicate with other base stations. In one example, the threshold SINR can be a predefined value, or alternatively it can be varied based on network conditions. Similarly, a modulation scheme and/or code rate applied to authorization signals by modulation/coding module 324 can vary based on changes in the threshold SINR and/or changes in observed network conditions. By way of specific example, a modulation scheme and/or code rate applied by modulation/coding module 324 can leverage the fact that channel impairments such as noise result in the probability of successful reception of a signal to decrease as a function of SINR. Thus, modulation/coding module 324 can utilize an error correction code such as a turbo-code, a Low-Density Parity Check (LDPC) code, or the like with a sufficiently large block length to ensure that decoding of an authorization signal is substantially impossible below a first threshold SINR, which can be denoted as $SINR_0$, and substantially guaranteed above a second threshold SINR, which can be denoted as $SINR_1$. In one example, $SINR_0$ and $SINR_1$ can be designed to be substantially close to one another (e.g., within 1 dB).

In accordance with another aspect, upon generation of an authorization signal at base station 320, the authorization signal can be transmitted to one or more mobile terminals 310. For example, base station 320 can broadcast the authorization signal, transmit the authorization signal in a unicast or multicast transmission to mobile terminals 310 predetermined to be within range of base station 320, and/or by other suitable means. In one example, base station 320 can generate and transmit any number of authorization signals in the above manner and/or any other manner at any suitable periodic or non-periodic interval.

Subsequent to transmission by base station 320, one or more encoded authorization signals can be received at a mobile terminal 310 within range of base station 320. In one example, mobile terminal 310 can be configured to receive authorization signals from base station 320 even if base station 320 is not serving mobile terminal 310. For example, mobile terminal 310 can be configured to always attempt to detect authorization signals transmitted from one or more base stations 320 within the RF neighborhood in which mobile terminal 310 is located. Alternatively, if mobile terminal 310 attempts to connect to and/or communicate with a serving base station but is unable to do so due to jamming from one or more base stations 320, mobile terminal 310 can enter an operation mode for detecting one or more authorization signals from the jamming base station(s) 320 in connection with a resource reservation request.

Upon receiving respective encoded authorization signals, a decoder 332 and/or one or more other suitable components at mobile terminal 310 can attempt to decode the authorization signal to obtain a random number and/or other information contained within the signal. In one example, mobile terminal 310 can further include a data buffer 314 for storing information contained in one or more previously received and decoded authorization signals.

In accordance with one aspect, upon receiving one or more authorization signals from base station 320, mobile terminal 310 can utilize the information contained in the respective signals to request that base station 320 set aside certain resources as illustrated in diagram 304. In one example, mobile terminal 310 can utilize a reservation request module 316 and/or any other suitable component(s) to determine a set of resources to be desirably reserved by base station 320 and to submit a request to base station 320 for the reservation of the determined resources. For example, based on an extent to which base station 320 is jamming mobile terminal 310 and/or other factors, reservation request module 316 can determine whether resources are to be reserved for initial connection setup between mobile terminal 310 and a desired serving base station for mobile terminal 310, scheduled communications between mobile terminal 310 and a desired serving base station for mobile terminal 310, and/or any other appropriate uses.

In accordance with another aspect, in order to ensure to base station 320 that mobile terminal 310 observes sufficient jamming from base station 320, mobile terminal 310 can additionally submit information relating to one or more decoded authorization signals to base station 320 in connection with a request for resource reservation. In one example, information submitted in connection with a request for resource reservation can include one or more random numbers generated by random number generator 322 and encoded into authorization signals at respectively predetermined times in the past. Information to be submitted with a request for resource reservation can be set in a variety of manners. For example, mobile terminal 310 and/or base station 320 can be preconfigured such that mobile terminal 310 provides authorization signal information corresponding to predefined transmissions either with or immediately following submission of a reservation request. Alternatively, upon receiving a reservation request from mobile terminal 310, base station 320 can prompt mobile terminal 310 to provide information relating to one or more specified authorization signal transmissions.

Upon receiving a resource reservation request and related authorization information, a resource reservation module 326 at base station 320 can initially compare the authorization information received from mobile terminal 310 to authorization information actually broadcasted to determine whether mobile terminal 310 has sufficiently proven that it observes at least a threshold SINR from base station 320 to warrant resource reservation. In one example, upon identifying a sufficient match between received information from mobile terminal 310 and corresponding broadcasted information, resource reservation module 326 can grant the request of mobile terminal 310 and set aside one or more requested resources. Alternatively, if resource reservation module 326 determines that the information received from mobile terminal 310 and corresponding broadcasted information do not sufficiently match, resource reservation module 326 can deny the request to set aside resources, limit reservation of resources in response to the request to a nominal or otherwise small value, and/or perform one or more other appropriate actions.

In accordance with one aspect, resource reservation module 326 can additionally regulate the amount of resources that are set aside for a successful request by mobile terminal 310. For example, resource reservation module 326 can limit reserved resources to a maximum value that can be predefined as a constant parameter and/or a dynamic parameter based on the extent to which the authorization information provided by mobile terminal 310 matches broadcasted authorization information. As another example, resource reservation module 326 can limit the duration of a resource reservation to within a predefined time interval such that mobile terminal 310 is required to periodically resubmit requests for resource reservation that include verification that mobile terminal 310 remains jammed by base station 320.

In accordance with another aspect, signaling messages can be directly communicated from mobile terminal 310 to base station 320, forwarded from mobile terminal 310 to base station 320 indirectly via a backhaul link from another base station (not shown), or through a combination of direct and indirect signaling. For example, mobile terminal 310 can request resource reservation for a short time duration utilizing direct signaling to base station 320, through which a temporary reservation can be granted by base station 320 to allow mobile terminal 310 to establish a connection with another desired base station. Subsequently, mobile terminal 310 can extend the existing resource reservation through one or more backhaul messages to base station 320 tunneled through the serving base station for mobile terminal 310.

Figure 4:
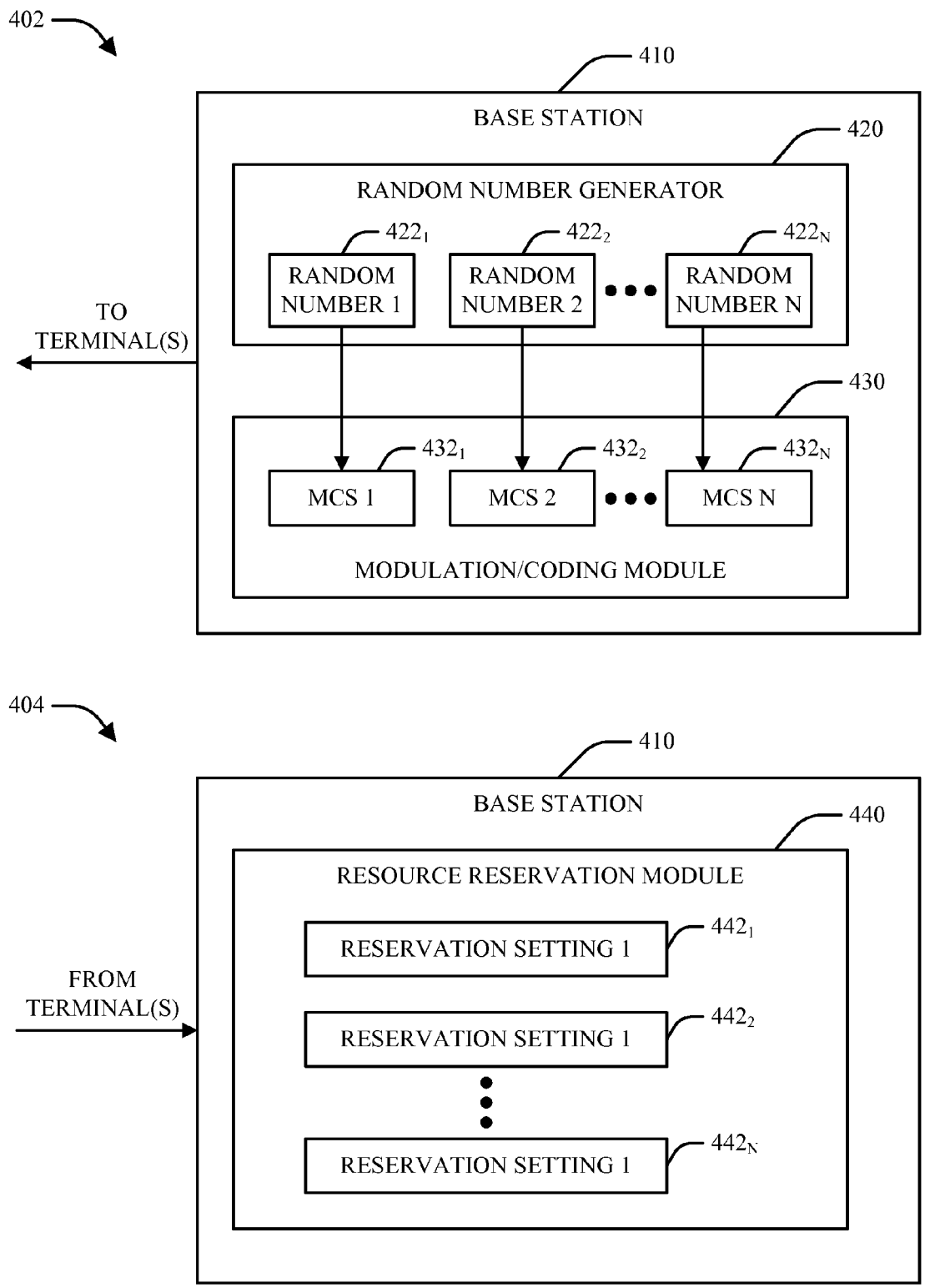

Referring to FIG. 4, respective diagrams 402-404 are provided that illustrate another system for proximity authentication in a wireless communication system. In one example, the system illustrated by FIG. 4 can include a base station 410, which can communicate with one or more terminals (not shown). In a similar manner to base station 320 in the system illustrated by FIG. 3, base station 410 can implement one or more techniques for verifying that a terminal is experiencing interference and/or jamming from base station 410 prior to setting aside interlaces for the terminal. To these ends, diagram 402 illustrates that base station 410 can include a random number generator 420 and a modulation/coding module 430, which can generate an encoded authorization signal using a time-varying random number and/or other suitable information in a similar manner to base station 320 in FIG. 3.

In accordance with one aspect, base station 410 can generate multiple authorization signals for transmission to one or more terminals as further illustrated by diagram 402. In one example, random number generator 420 at base station 410 can generate multiple random numbers or sequences 422, which can be independently modulated and/or coded by modulation/coding module 430 using respective MCSs 432 corresponding to the random numbers 422. Modulation/coding module 422 can apply MCSs 432 to respective authorization signals such that, for example, each authorization signal requires a different SINR to be properly decoded. Thus, for example, a first MCS 432 can comprise a first modulation scheme and/or code rate selected such that a certain moderate SINR is required for proper decoding, a second MCS 432 can comprise a second modulation scheme and/or code rate selected to require a higher SINR, a third MCS 432 can comprise a third modulation scheme and/or code rate selected to require a higher SINR than the second MCS 432, and so on. One or more generated authorization signals can then be transmitted to one or more terminals as generally described above.

Subsequently, as illustrated by diagram 404, a resource reservation module 440 at base station 410 can be configured with a set of reservation settings 442 corresponding to the respective authorization signals as generated by random number generator 420 and modulation/coding module 430 as illustrated in diagram 402. Thus, for example, a first reservation setting 442 can correspond to a first MCS 432, a second reservation setting 442 can correspond to a second MCS 432, and so on. In one example, respective reservation settings 442 can specify a limit for resources that can be requested for reservation by a terminal upon successful decoding of an authorization signal corresponding to a reservation setting 442. For example, a terminal that successfully reports only a first authorization signal requiring a moderate SINR can be allotted a small number of reserved resources according to a first reservation setting 442, while a terminal that successfully reports a second authorization signal requiring a higher SINR can be permitted to request a larger number of reserved resources according to a second reservation setting 442.

Figure 5:
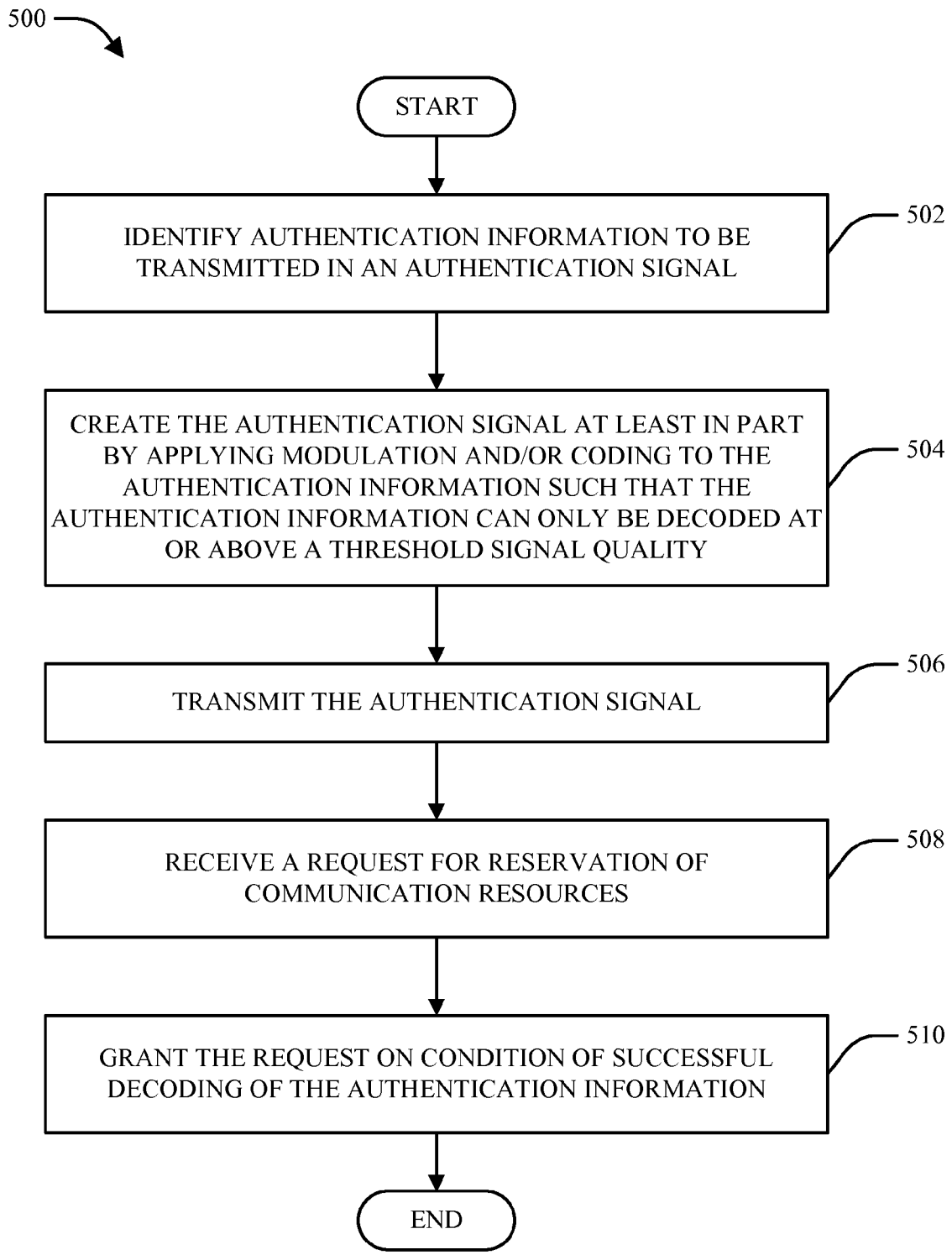
FIG. 5 is a flow diagram of a methodology for performing proximity verification in a wireless communication system.
Figure 6:
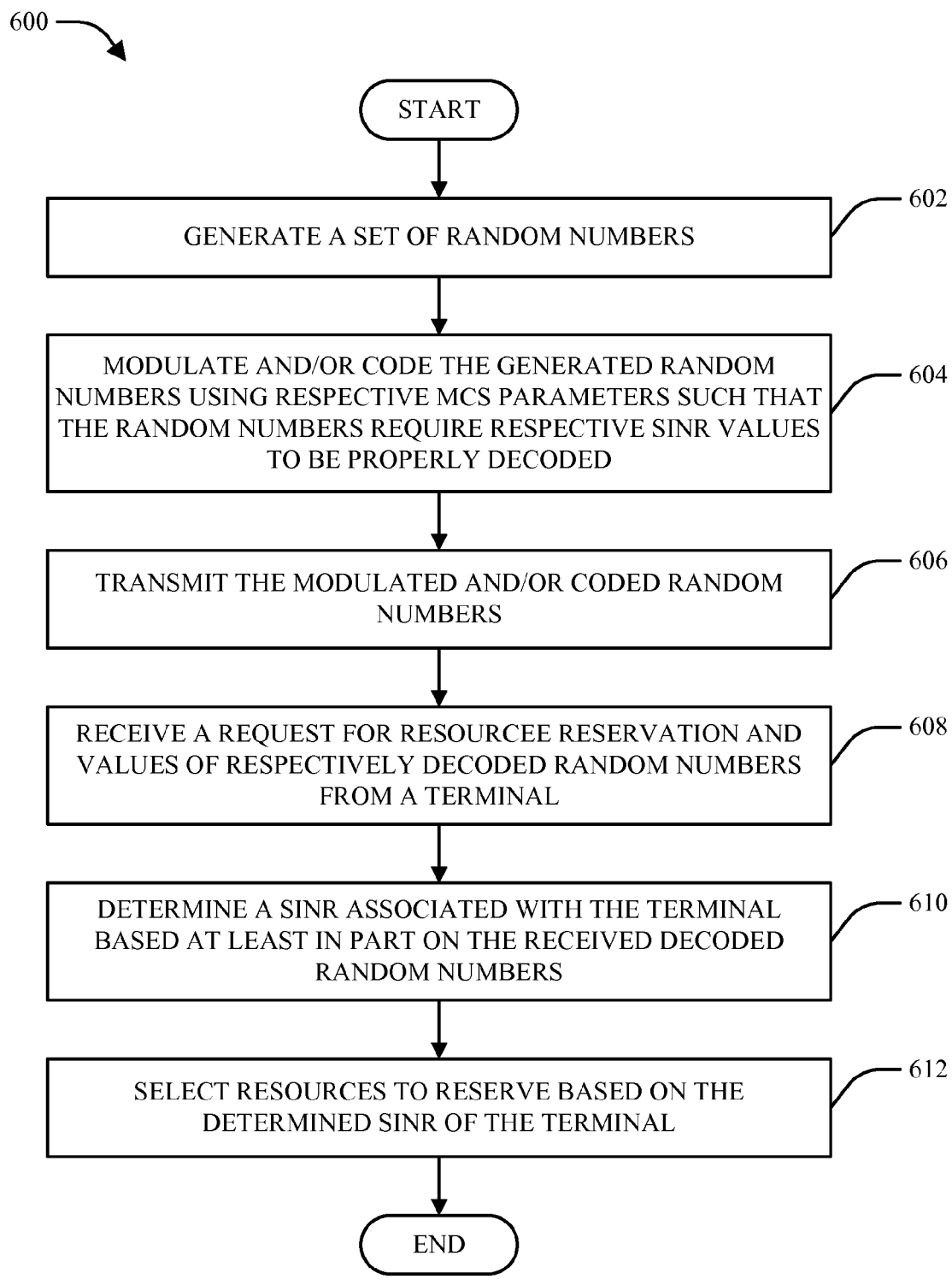
FIG. 6 is a flow diagram of a methodology for identifying the proximity of a terminal according to a tiered message structure.
Figure 7:
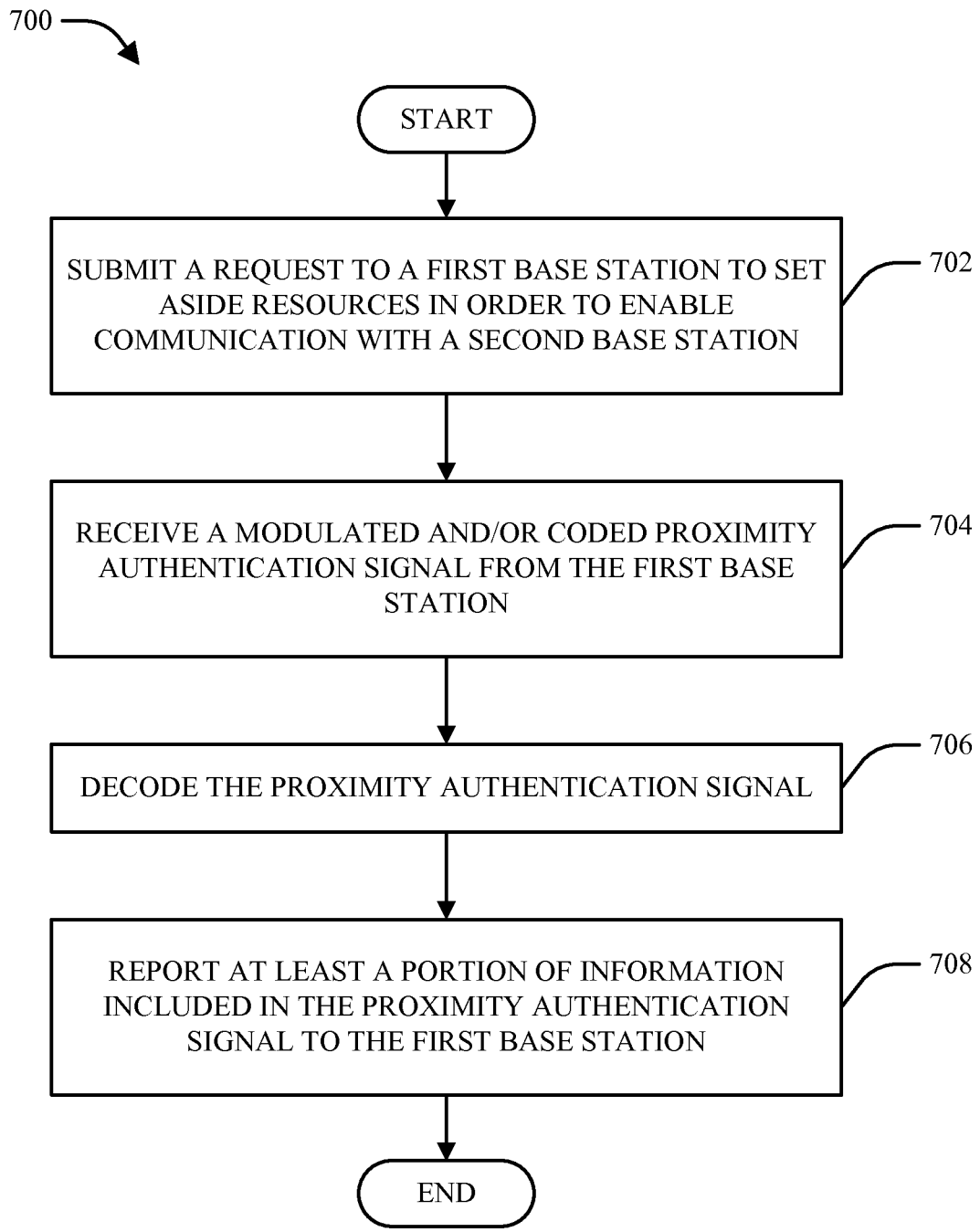
FIG. 7 is a flow diagram of a methodology for submitting an authenticated request for reservation of resources in a wireless communication system.

Referring now to FIGS. 5-7, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 5, illustrated is a methodology 500 for performing proximity verification in a wireless communication system. It is to be appreciated that methodology 500 can be performed by, for example, a base station (e.g., base station 320) and/or any other appropriate network device. Methodology 500 begins at block 502, wherein authentication information (e.g. a random number generated by random number generator 322) to be transmitted in an authentication signal is identified. Next, at block 504, the authentication signal is created at least in part by applying modulation and/or coding to the authentication information identified at block 502 (e.g., via a modulation/coding module 324) such that the authentication information can only be decoded at or above a threshold signal quality (e.g., a threshold SINR). At block 506, the authentication signal created at block 504 is then transmitted.

Upon completing the acts described at block 506, methodology 500 can proceed to block 508, wherein a request is received (e.g., by a mobile terminal 310) for reservation of communication resources. Methodology 500 can then conclude at block 510, wherein the request received at block 508 is granted (e.g., by a resource reservation module 326) on condition of successful decoding of the authentication information by the entity from which the request was received at block 508.

FIG. 6 illustrates a methodology 600 for identifying the proximity of a terminal according to a tiered message structure. Methodology 600 can be performed by, for example, a base station (e.g., base station 410) and/or any other suitable network device. Methodology 600 begins at block 602, wherein a set of random numbers (e.g. random numbers 422) is generated (e.g., by a random number generator 420). Next, at block 604, the random numbers generated at block 602 are modulated and/or coded (e.g., by a modulation/coding module 430) using respective MCS parameters (e.g. MCSs 432) such that the random numbers require respective SINR values to be properly decoded. The modulated and/or coded random numbers can then be transmitted at block 606.

Subsequently, at block 608, a request for resource reservation can be received from a terminal (e.g. mobile terminal 310), which can include values of respective random numbers transmitted at block 606 as decoded by the terminal. At block 610, a SINR associated with the terminal from which the request was received at block 608 can then be determined based at least in part on the decoded random numbers received from the terminal at block 608. Methodology 600 can then conclude at block 612, wherein resources to be reserved are selected (e.g., by a resource reservation module 440 using one or more reservation settings 442) based on the SINR associated with the terminal as determined at block 610.

Referring to FIG. 7, illustrated is a methodology 700 for submitting an authenticated request for reservation of resources in a wireless communication system. It is to be appreciated that methodology 700 can be performed by, for example, a terminal (e.g., access terminal 110 or mobile terminal 310) and/or any other appropriate network device. Methodology 700 begins at block 702, wherein a request is submitted to a first base station (e.g., interfering base station 130 or base station 320) to set aside resources in order to enable communication with a second base station (e.g., desired base station 120). Next, at block 704, a modulated and/or coded proximity authentication signal is received from the base station to which the request was submitted at block 704. Upon completing the acts described at block 704, the proximity authentication signal can be decoded at block 706 (e.g. by a decoder 332), and at least a portion of information included in the proximity authentication signal can be reported at block 708 to the base station to which the request was submitted at block 704.

In accordance with one aspect, the acts described at block 702-706 can occur in any suitable order. For example, proximity authentication signals can be received as described at block 704 and/or decoded as described at block 706 prior to, during, and/or in response to a request submitted as described at block 702.

Figure 8:
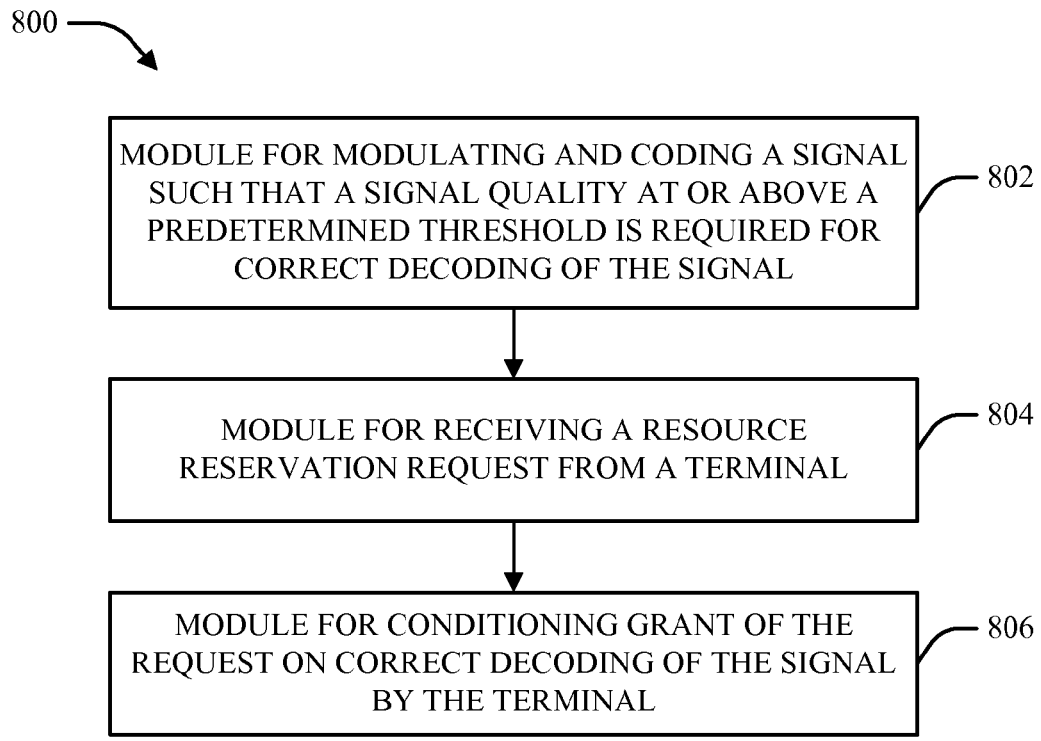
FIGS. 8-9 are block diagrams of respective apparatus that facilitate secured interference management in a wireless communication system.

Referring next to FIG. 8, an apparatus 800 that facilitates secured interference management in a wireless communication system is illustrated. It is to be appreciated that apparatus 800 is represented as including functional blocks, which can be functional blocks that represent functions implemented by a processor, software, or combination thereof (e.g., firmware). Apparatus 800 can be implemented by a base station (e.g., base station 320) and/or another suitable network device and can include a module 802 for modulating and coding a signal such that a signal quality at or above a predetermined threshold is required for correct decoding of the signal, a module 804 for receiving a resource reservation request from a terminal, and a module 806 for conditioning grant of the request on correct decoding of the signal by the terminal.

Figure 9:
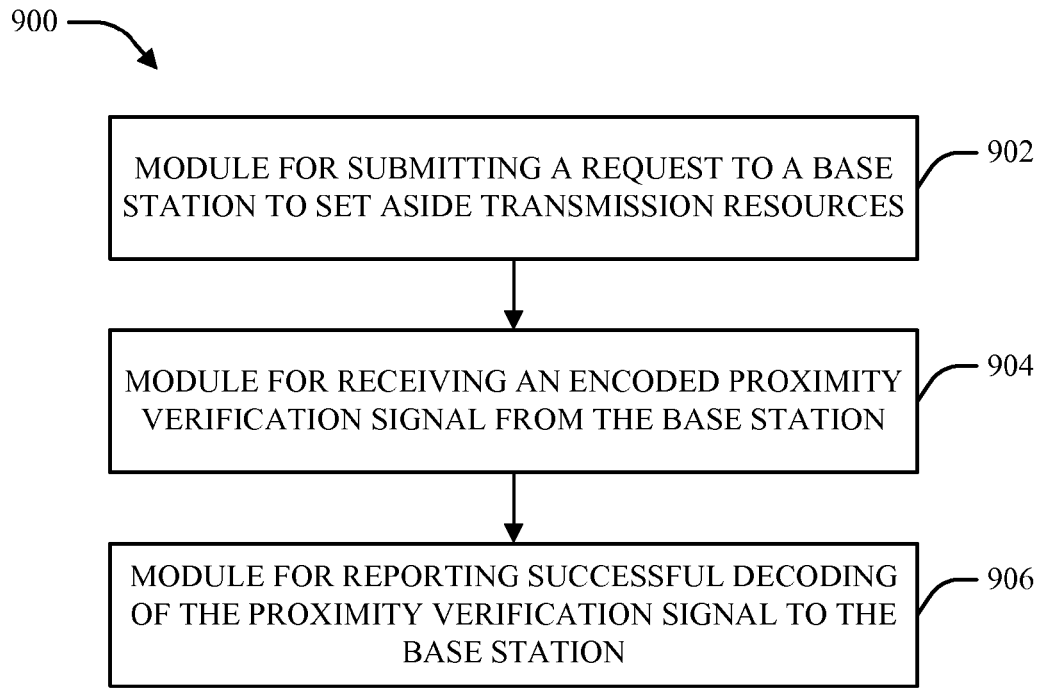

Turning to FIG. 9, another apparatus 900 that facilitates secured interference management in a wireless communication system is illustrated. It is to be appreciated that apparatus 900 is represented as including functional blocks, which can be functional blocks that represent functions implemented by a processor, software, or combination thereof (e.g., firmware). Apparatus 900 can be implemented by an access terminal (e.g., mobile terminal 310) and/or another suitable network device and can include a module 902 for submitting a request to a base station to set aside transmission resources, a module 904 for receiving an encoded proximity verification signal from the base station, and a module 906 for reporting successful decoding of the proximity verification signal to the base station.

Figure 10:
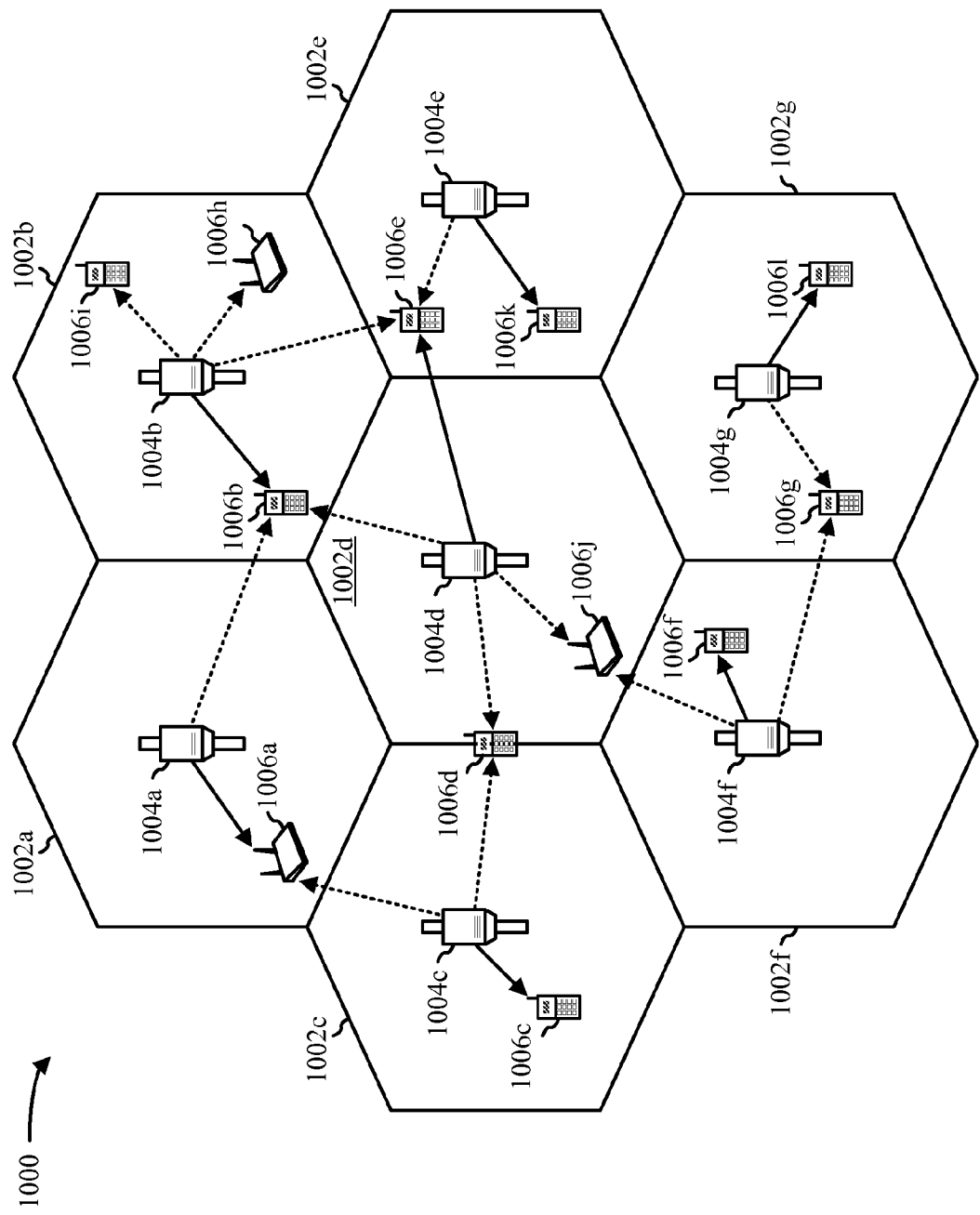
FIG. 10 illustrates an example wireless communication system in accordance with various aspects set forth herein.

Turning to FIG. 10, an exemplary wireless communication system 1000 is illustrated. In one example, system 1000 can be configured to support a number of users, in which various disclosed embodiments and aspects can be implemented. As shown in FIG. 10, by way of example, system 1000 can provide communication for multiple cells 1002, (e.g., macro cells 1002a-1002g), with respective cells being serviced by corresponding access points (AP) 1004 (e.g., APs 1004a-1004g). In one example, one or more cells can be further divided into respective sectors (not shown).

As FIG. 10 further illustrates, various access terminals (ATs) 1006, including ATs 1006a-1006k, can be dispersed throughout system 1000. In one example, an AT 1006 can communicate with one or more APs 1004 on a forward link (FL) and/or a reverse link (RL) at a given moment, depending upon whether the AT is active and whether it is in soft handoff and/or another similar state. As used herein and generally in the art, an AT 1006 can also be referred to as a user equipment (UE), a mobile terminal, and/or any other suitable nomenclature. In accordance with one aspect, system 1000 can provide service over a substantially large geographic region. For example, macro cells 1002a-1002g can provide coverage for a plurality of blocks in a neighborhood and/or another similarly suitable coverage area.

Figure 11:
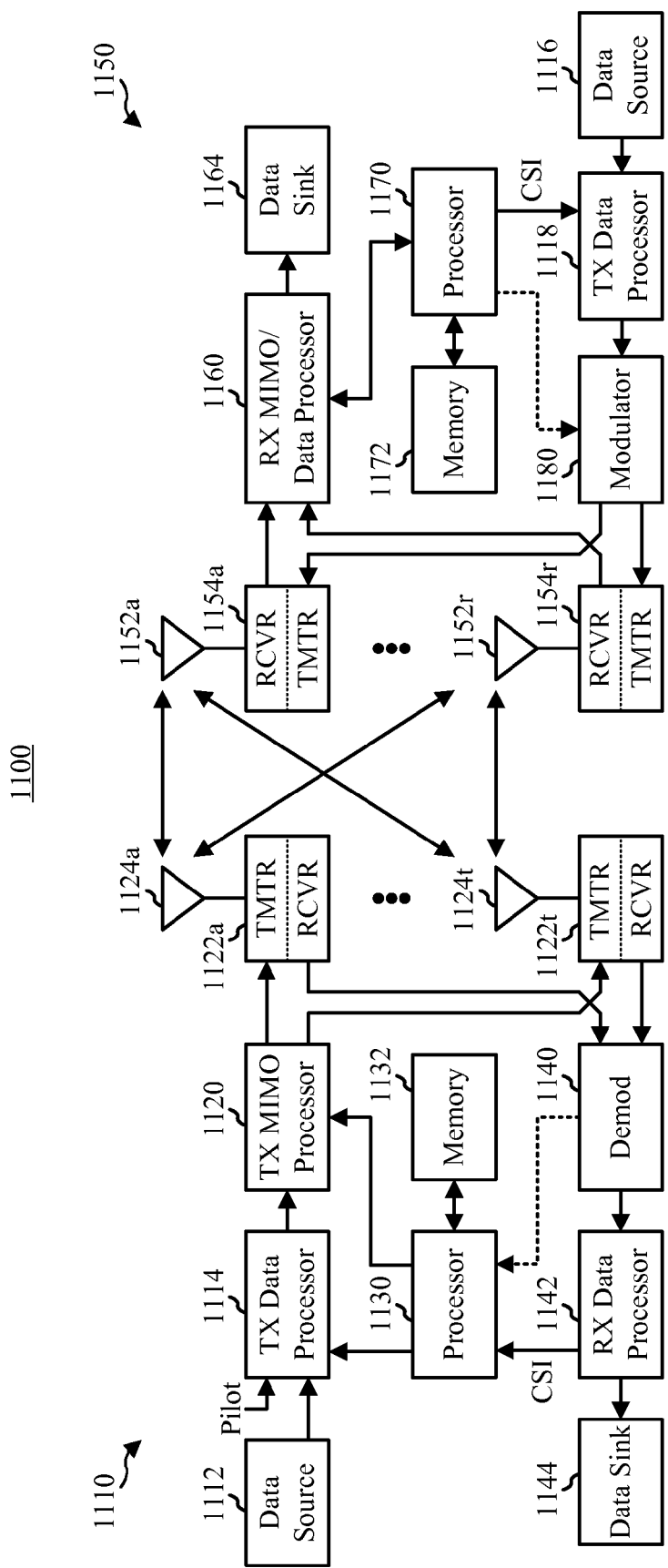
FIG. 11 is a block diagram illustrating an example wireless communication system in which various aspects described herein can function.

Referring now to FIG. 11, a block diagram illustrating an example wireless communication system 1100 in which various aspects described herein can function is provided. In one example, system 1100 is a multiple-input multiple-output (MIMO) system that includes a transmitter system 1110 and a receiver system 1150. It should be appreciated, however, that transmitter system 1110 and/or receiver system 1150 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1110 and/or receiver system 1150 described herein could be utilized in connection with a single output to single input antenna system.

In accordance with one aspect, traffic data for a number of data streams are provided at transmitter system 1110 from a data source 1112 to a transmit (TX) data processor 1114. In one example, each data stream can then be transmitted via a respective transmit antenna 1124. Additionally, TX data processor 1114 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1150 to estimate channel response. Back at transmitter system 1110, the multiplexed pilot and coded data for each data stream can be modulated (i.e., symbol mapped) based on a particular modulation scheme (e.g. BPSK, QSPK, M-PSK, or M-QAM) selected for each respective data stream in order to provide modulation symbols. In one example, data rate, coding, and modulation for each data stream can be determined by instructions performed on and/or provided by processor 1130.

Next, modulation symbols for all data streams can be provided to a TX processor 1120, which can further process the modulation symbols (e.g., for OFDM). TX MIMO processor 1120 can then provides $N_T$ modulation symbol streams to $N_T$ transceivers 1122a through 1122t. In one example, each transceiver 1122 can receive and process a respective symbol stream to provide one or more analog signals. Each transceiver 1122 can then further condition (e.g., amplify, filter, and upconvert) the analog signals to provide a modulated signal suitable for transmission over a MIMO channel. Accordingly, $N_T$ modulated signals from transceivers 1122a through 1122t can then be transmitted from $N_T$ antennas 1124a through 1124t, respectively.

In accordance with another aspect, the transmitted modulated signals can be received at receiver system 1150 by $N_R$ antennas 1152a through 1152r. The received signal from each antenna 1152 can then be provided to respective transceivers 1154. In one example, each transceiver 1154 can condition (e.g., filter, amplify, and downconvert) a respective received signal, digitize the conditioned signal to provide samples, and then processes the samples to provide a corresponding "received" symbol stream. An RX MIMO/data processor 1160 can then receive and process the $N_R$ received symbol streams from $N_R$ transceivers 1154 based on a particular receiver processing technique to provide $N_T$ "detected" symbol streams. In one example, each detected symbol stream can include symbols that are estimates of the modulation symbols transmitted for the corresponding data stream. RX processor 1160 can then process each symbol stream at least in part by demodulating, deinterleaving, and decoding each detected symbol stream to recover traffic data for a corresponding data stream. Thus, the processing by RX processor 1160 can be complementary to that performed by TX MIMO processor 1120 and TX data processor 1116 at transmitter system 1110. RX processor 1160 can additionally provide processed symbol streams to a data sink 1164.

In accordance with one aspect, the channel response estimate generated by RX processor 1160 can be used to perform space/time processing at the receiver, adjust power levels, change modulation rates or schemes, and/or other appropriate actions. Additionally, RX processor 1160 can further estimate channel characteristics such as, for example, signal-to-noise-and-interference ratios (SNRs) of the detected symbol streams. RX processor 1160 can then provide estimated channel characteristics to a processor 1170. In one example, RX processor 1160 and/or processor 1170 can further derive an estimate of the "operating" SNR for the system. Processor 1170 can then provide channel state information (CSI), which can comprise information regarding the communication link and/or the received data stream. This information can include, for example, the operating SNR. The CSI can then be processed by a TX data processor 1118, modulated by a modulator 1180, conditioned by transceivers 1154a through 1154r, and transmitted back to transmitter system 1110. In addition, a data source 1116 at receiver system 1150 can provide additional data to be processed by TX data processor 1118.

Back at transmitter system 1110, the modulated signals from receiver system 1150 can then be received by antennas 1124, conditioned by transceivers 1122, demodulated by a demodulator 1140, and processed by a RX data processor 1142 to recover the CSI reported by receiver system 1150. In one example, the reported CSI can then be provided to processor 1130 and used to determine data rates as well as coding and modulation schemes to be used for one or more data streams. The determined coding and modulation schemes can then be provided to transceivers 1122 for quantization and/or use in later transmissions to receiver system 1150. Additionally and/or alternatively, the reported CSI can be used by processor 1130 to generate various controls for TX data processor 1114 and TX MIMO processor 1120. In another example, CSI and/or other information processed by RX data processor 1142 can be provided to a data sink 1144.

In one example, processor 1130 at transmitter system 1110 and processor 1170 at receiver system 1150 direct operation at their respective systems. Additionally, memory 1132 at transmitter system 1110 and memory 1172 at receiver system 1150 can provide storage for program codes and data used by processors 1130 and 1170, respectively. Further, at receiver system 1150, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 12:
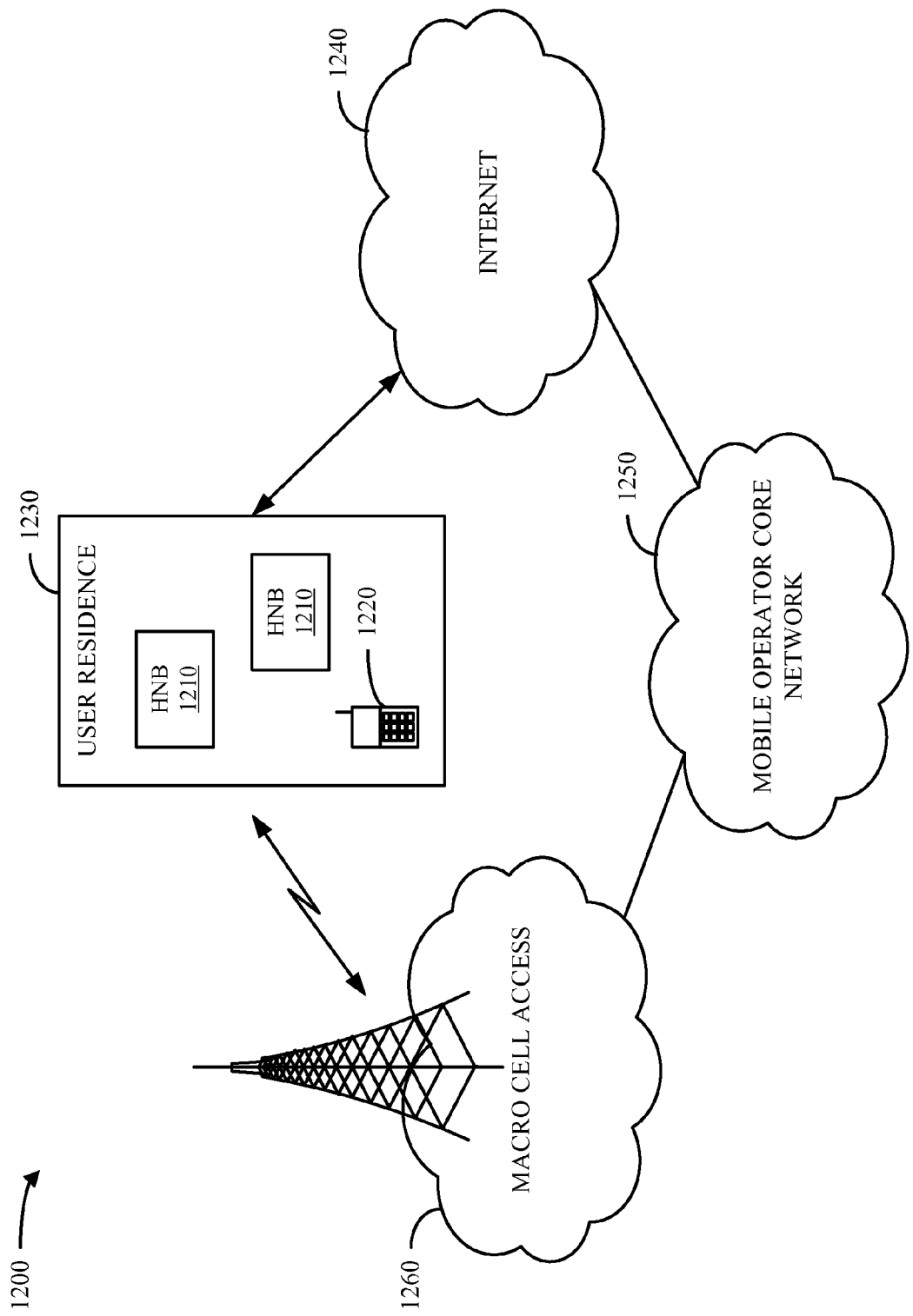
FIG. 12 illustrates an example communication system that enables deployment of access point base stations within a network environment.

FIG. 12 illustrates an example communication system 1200 that enables deployment of access point base stations within a network environment. As shown in FIG. 12, system 1200 can include multiple access point base stations (e.g., femto cells or Home Node B units (HNBs)) such as, for example, HNBs 1210. In one example, respective HNBs 1210 can be installed in a corresponding small scale network environment, such as, for example, one or more user residences 1230. Further, respective HNBs 1210 can be configured to serve associated and/or alien UE(s) 1220. In accordance with one aspect, respective HNBs 1210 can be coupled to the Internet 1240 and a mobile operator core network 1250 via a DSL router, a cable modem, and/or another suitable device (not shown). In accordance with one aspect, an owner of a femto cell or HNB 1210 can subscribe to mobile service, such as, for example, 3G/4G mobile service, offered through mobile operator core network 1250. Accordingly, UE 1220 can be enabled to operate both in a macro cellular environment 1260 and in a residential small scale network environment.

In one example, UE 1220 can be served by a set of Femto cells or HNBs 1210 (e.g., HNBs 1210 that reside within a corresponding user residence 1230) in addition to a macro cell mobile network 1260. As used herein and generally in the art, a home femto cell is a base station on which an AT or UE is authorized to operate on, a guest femto cell refers to a base station on which an AT or UE is temporarily authorized to operate on, and an alien femto cell is a base station on which the AT or UE is not authorized to operate on. In accordance with one aspect, a femto cell or HNB 1210 can be deployed on a single frequency or on multiple frequencies, which may overlap with respective macro cell frequencies.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method, comprising:
receiving, by an interfering base station, a request, from an access terminal, to reserve transmission resources for the access terminal to allow communication with a serving base station;
transmitting at least one authentication signal to the access terminal using a transmitter, the at least one authentication signal comprising a randomly generated authentication number that is channel-encoded to ensure that decoding of the authentication signal is substantially impossible below a predetermined signal quality threshold;
receiving a response to the at least one authentication signal from the access terminal that indicates that the access terminal successfully recovered the at least one authentication signal from the transmitter;
determining whether the access terminal is in a predefined proximity of the transmitter by determining the at least one transmitted authentication signal is received by the access terminal at or above the predetermined signal quality threshold based on a number of authentication signals successfully recovered by the access terminal over a predetermined period of time;
selecting an amount of transmission resources to reserve as a function of the predetermined signal quality threshold; and
reserving the selected amount of requested transmission resources upon determining that the access terminal is in the predefined proximity.

2. The method of claim 1, wherein the reserving comprises reserving requested transmission resources up to a predefined resource limit.

3. The method of claim 1, wherein the reserving comprises reserving requested transmission resources for a predetermined duration in time.

4. The method of claim 1, further comprising denying the request to reserve transmission resources upon determining that the access terminal is not in a predefined proximity of the transmitter based on the number of authentication signals successfully recovered by the access terminal over the predetermined period of time.

5. The method of claim 1, further comprising:
selecting a modulation and coding scheme (MCS) for the at least one authentication signal such that the at least one authentication signal can be correctly decoded only at or above the predetermined signal quality threshold; and
generating the at least one authentication signal using the selected MCS.

6. The method of claim 1, wherein the predetermined signal quality threshold is a threshold signal-plus-interference-to-noise (SINR) ratio.

7. The method of claim 1, further comprising generating a plurality of authentication signals using respective MCSs that require disparate threshold signal qualities for correct decoding, wherein the transmitting comprises transmitting the plurality of generated authentication signals.

8. The method of claim 1, wherein the transmitting occurs prior to receiving the response.

9. The method of claim 1, wherein the transmitting comprises communicating the at least one authentication signal in a broadcast transmission.

10. A wireless communications apparatus, comprising:
a memory that stores data relating to one or more proximity verification signals; and
a processor that receives a request from a terminal to set aside resources, transmits the one or more proximity verification signals to the terminal, the one or more proximity verification signals comprising a randomly generated number that is channel-encoded to ensure that decoding of the one or more verification signals is substantially impossible below a predetermined signal quality threshold, receives respective responses from the terminal with random decoded information, determines whether the one or more proximity verification signals were received by the terminal at or above the predetermined signal quality threshold based on the respective responses by comparing the randomly generated number to the decoded random information and on a number of authentication signals successfully recovered by the access terminal over a predetermined period of time; and
the processor further inserts the randomly generated number into the one or more proximity verification signals, selects an amount of resources to set aside as a function of the predetermined signal quality, and sets aside the selected resources upon confirming that the one or more proximity verification signals were received by the terminal at or above the predetermined threshold signal quality.

11. The wireless communications apparatus of claim 10, wherein the resources set aside by the processor comprise one or more interlaces corresponding to a predefined duration in time.

12. The wireless communications apparatus of claim 10, wherein the processor further uses a modulation and coding scheme (MCS) for the one or more proximity verification signals selected such that the one or more proximity verification signals require a signal quality at or above the threshold signal quality for correct decoding.

13. The wireless communications apparatus of claim 10, wherein the processor further modulates and codes a plurality of proximity authentication signals using respective MCSs that require disparate threshold signal qualities for correct decoding; wherein transmitting the one or more proximity verification signals comprises transmitting the plurality of proximity verification signals to the terminal.

14. The wireless communications apparatus of claim 10, wherein the processor communicates the one or more proximity verification signals in a broadcast transmission.

15. An apparatus, comprising:
means for receiving a resource reservation request from a terminal;
means for modulating and coding a signal, wherein the coded signal comprises a random authentication code, such that a signal quality at or above a predetermined threshold is required for correct decoding of the modulated and coded signal with high probability and to ensure that decoding of the modulated and coded signal is substantially impossible below the predetermined threshold;
means for providing the modulated and coded signal to the terminal;
means for determining strength of a downlink channel to the terminal from a transmitter of the apparatus indicating a proximity of the terminal to the transmitter based on an extent to which the terminal correctly decodes the modulated and coded signal and based on a number of authentication signals successfully recovered by the terminal over a predetermined period of time;
means for determining an extent to which the request is to be granted based at least in part on the strength of the downlink channel; and
means for granting the request as a function of the signal quality and a number of the signals correctly decoded by the access terminal over a predetermined period of time upon determining that the access terminal is in the predefined proximity.

16. The apparatus of claim 15, wherein the signal comprises a time-varying random number.

17. The apparatus of claim 15, wherein the means for modulating and coding comprises means for modulating and coding a plurality of signals, wherein the coded signals comprise random authentication codes, such that respective modulated and coded signals require disparate signal quality thresholds for correct decoding.

18. A non-transitory computer readable medium comprising program instructions to implement secure interference management in a wireless communication system, comprising:
program instructions that cause a computer to identify authorization information;
program instructions that cause the computer to modulate and code the identified authorization information, the authorization information comprising random authentication information, using modulation and coding parameters selected such that the authorization information can be successfully decoded only if an observed signal quality is at least a threshold value to authenticate a terminal's proximity to a requesting device and to ensure that decoding of the signal is substantially impossible below the predetermined threshold;
program instructions that cause the computer to receive a request to set aside resources of the requesting device for use by the terminal;
program instructions that cause the computer to communicate the modulated and coded authorization information to the terminal;
program instructions that cause the computer to select an amount of resources to set aside as a function of the predetermined signal quality threshold and a number of authentication signals successfully recovered by the access terminal over a predetermined period of time; and
program instructions that cause the computer to set aside the selected resources upon identifying that the terminal has correctly decoded the authorization information.

19. An integrated circuit that executes computer-executable instructions, the instructions comprising:
modulating and coding at least one signal such that correct decoding of the at least one modulated and coded signal at a receiver indicates that a received signal quality is at or above a predetermined threshold to authenticate an entity's proximity to a base station and to ensure that decoding of the signal is substantially impossible below the predetermined threshold;
inserting random authentication information into the at least one signal;
identifying a request to vacate communication resources;
selecting an amount of communication resources to vacate as a function of the predetermined signal quality threshold and a number of the at least one signal successfully recovered by the access terminal over a predetermined period of time; and
vacating the selected communication resources in response to the request upon determining that the entity that provided the request to vacate communication resources has correctly decoded the at least one modulated and coded signal.

20. A method, comprising:
submitting a request to a first base station to set aside communication resources in order to enable communication with a second base station;
receiving at least one proximity authentication signal from the first base station, the at least one authentication signal comprising random encoded authentication information;
decoding the at least one proximity authentication signal to authenticate a proximity to the first base station if the authentication signal quality is at or above a predetermined threshold value;
reporting at least a portion of the at least one decoded proximity authentication signal to the first base station; and
communicating with the second base station on an amount communication resources of the first base station set aside as a function of the predetermined threshold and a number of authentication signals successfully decoded over a predetermined period of time.

21. The method of claim 20, wherein the first base station is a restricted femto cell.

22. The method of claim 20, wherein the second base station is a serving base station.

23. The method of claim 22, wherein the submitting comprises submitting a request to the first base station to set aside communication resources in order to enable initialization of a communication link with the second base station.

24. The method of claim 22, wherein the submitting comprises submitting a request to the first base station to set aside communication resources in order to enable communication with the second base station using a pre-established communication link with the second base station.

25. The method of claim 20, wherein the at least one proximity authentication signal is modulated and coded such that successful decoding of the at least one proximity authentication signal requires the at least one proximity authentication signal to be received at or above the predetermined signal quality threshold.

26. The method of claim 20, wherein the receiving occurs prior to the submitting.

27. The method of claim 26, further comprising buffering at least one decoded proximity authentication signal prior to the reporting.

28. The method of claim 20, wherein the receiving comprises receiving a plurality of proximity authentication signals that are modulated and coded such that successful decoding of respective proximity authentication signals requires the respective proximity authentication signals to be received at or above respectively corresponding threshold signal qualities.

29. A wireless communications apparatus, comprising:
a memory that stores data relating to a desired base station and an interfering base station; and
a processor that submits a request to the interfering base station to reserve resources in order to enable communication between the wireless communications apparatus and the desired base station, receives an encoded signal from the interfering base station, the encoded signal comprising random authentication information, decodes the encoded signal to authenticate a proximity of the wireless communications apparatus to the interfering base station if the encoded signal quality is at or above a predetermined threshold value and to ensure that decoding of the signal is substantially impossible below the predetermined threshold value by communicating at least a portion of the decoded signal back to the interfering base station, and communicates with the desired base station on an amount of resources of the interfering base station reserved as a function of the predetermined signal quality threshold value and a number of authentication signals successfully recovered by the apparatus over a predetermined period of time.

30. The wireless communications apparatus of claim 29, wherein the interfering base station is a femto cell that provides coverage for an area embedded within a coverage area of the desired base station.

31. The wireless communications apparatus of claim 29, wherein the encoded signal is modulated and coded such that successful decoding thereof requires the encoded signal to be received at or above the signal quality threshold value.

32. The wireless communications apparatus of claim 29, wherein the processor further buffers at least a portion of the decoded signal prior to reporting.

33. The wireless communications apparatus of claim 29, wherein the processor further receives a plurality of encoded signals that are modulated and coded such that successful decoding of respective encoded signals requires the respective encoded signals to be received at or above respectively corresponding threshold signal qualities.

34. An apparatus, comprising:
   means for submitting a request to a base station to set aside transmission resources;
   means for receiving an encoded proximity verification signal and an authentication signal comprising random encoded authentication information from the base station to authenticate a proximity to the base station if the authentication signal quality is received at or above a predetermined threshold value and to ensure that decoding of the signal is substantially impossible below the predetermined threshold;
   means for reporting successful decoding of the proximity verification signal and the authentication signal to the base station; and
   means for communicating with a second base station on an amount of transmission resources of the base station set aside as a function of the predetermined signal quality threshold value and a number of proximity verification and authentication signals successfully recovered by the apparatus over a predetermined period of time.

35. The apparatus of claim 34, wherein the base station is a femto cell to which the apparatus is restricted and the means for submitting comprises means for submitting a request to the femto cell to set aside transmission resources for communication between the apparatus and a serving base station for the apparatus.

36. A non-transitory computer readable medium comprising program instructions to implement secure interference management in a wireless communication system, comprising:
   program instructions that cause a computer to identify a jamming base station;
   program instructions that cause the computer to request reservation of communication resources by the jamming base station;
   program instructions that cause the computer to receive, from the jamming base station, a proximity authentication challenge and authentication signal comprising random encoded authentication information to authenticate a proximity to the jamming base station by decoding the random encoded authentication information if the authentication signal quality is at or above a predetermined threshold value and to ensure that decoding of the random encoded authentication information is substantially impossible below the predetermined threshold;
   program instructions that cause the computer to submit a response to the proximity authentication challenge and the authentication signal to the jamming base station; and
   program instructions that cause the computer to communicate with a second base station on an amount of resources of the jamming base station reserved as a function of the predetermined signal quality threshold value and a number of proximity authentication challenge and authentication signals successfully recovered by the access terminal over a predetermined period of time.

37. The non-transitory computer readable medium of claim 36, wherein the proximity authentication challenge comprises one or more signals that are modulated and coded such that successful decoding of the one or more signals requires a signal quality from the jamming base station of at least a predetermined minimum value.

38. An integrated circuit that executes computer-executable instructions, the instructions comprising:
   submitting a request to a network cell to set aside transmission resources;
   receiving at least one encoded authorization signal, in response to the request, the authorization signal comprising random authentication information from the network cell for authenticating a proximity of the network cell if the authorization signal quality is received at or above a predetermined threshold value wherein decoding of the authorization signal is substantially impossible below the predetermined threshold;
   decoding at least a portion of the at least one encoded authorization signal;
   communicating one or more decoded portions of the at least one encoded authorization signal to the network cell; and
   communicating with a different network cell on an amount of transmission resources of the network cell set aside as a function of the predetermine signal quality threshold value and a number of authentication signals successfully recovered by the access terminal over a predetermined period of time.

39. The integrated circuit of claim 38, wherein the at least one encoded authorization signal is modulated and coded such that successful decoding of the at least one authorization signal requires reception of the at least one encoded authorization signal at or above a predefined signal quality threshold.

* * * * *